United States Patent
Kano et al.

(10) Patent No.: US 8,979,146 B2
(45) Date of Patent: Mar. 17, 2015

(54) VEHICLE BUMPER BEAM

(75) Inventors: Mitsutoshi Kano, Toyota (JP); Yasuhiro Yoshimura, Toyota (JP)

(73) Assignee: Toyoda Iron Works Co., Ltd., Nagoya-shi (JP)

( * ) Notice: Subject to any disclaimer, the term of this patent is extended or adjusted under 35 U.S.C. 154(b) by 0 days.

(21) Appl. No.: 14/365,552

(22) PCT Filed: Jul. 5, 2012

(86) PCT No.: PCT/JP2012/067235
§ 371 (c)(1),
(2), (4) Date: Jun. 13, 2014

(87) PCT Pub. No.: WO2013/088765
PCT Pub. Date: Jun. 20, 2013

(65) Prior Publication Data
US 2014/0367982 A1    Dec. 18, 2014

(30) Foreign Application Priority Data
Dec. 13, 2011   (JP) ................................ 2011-271924

(51) Int. Cl.
*B60R 19/04* (2006.01)
*B60R 19/18* (2006.01)
*B60R 19/03* (2006.01)

(52) U.S. Cl.
CPC .................. *B60R 19/18* (2013.01); *B60R 19/03* (2013.01); *B60R 2019/1813* (2013.01); *B60R 2019/1873* (2013.01)
USPC ........... 293/122; 293/132; 293/155; 293/120; 296/187.09

(58) Field of Classification Search
CPC ................................................. B60R 2019/186
USPC .................................. 293/122, 155, 133, 120
IPC ...................................................... B60R 19/04
See application file for complete search history.

(56) References Cited

U.S. PATENT DOCUMENTS

| 6,923,494 B2 * | 8/2005 | Shuler et al. ............. 296/187.05 |
| 7,954,864 B2 * | 6/2011 | Frederick et al. .............. 293/120 |
| 2010/0109353 A1 * | 5/2010 | Allen et al. .................... 293/120 |

FOREIGN PATENT DOCUMENTS

| JP | A-63-203309 | 8/1988 |
| JP | A-2005-520735 | 7/2005 |
| JP | A-2008-001204 | 1/2008 |

OTHER PUBLICATIONS

Japanese Office Action issued in Japanese Patent Application No. 2011-271924 on Jun. 3, 2014 (with translation).
International Search Report issued in International Application No. PCT/JP2012/067235 dated Oct. 2, 2013.

* cited by examiner

*Primary Examiner* — Pinel Romain
(74) *Attorney, Agent, or Firm* — Oliff PLC

(57) ABSTRACT

A vehicle bumper beam including: a resin beam having an elongate body extending along a vehicle-width direction, two tubular shock-absorbing portions disposed at the beam body's opposite longitudinal end portions extending in front-rear direction, the beam body and shock-absorbing portions being formed with each other; a metal beam disposed outside the resin beam in the front-rear direction, fixedly fitted to the resin beam. Further, flat attachment portions, formed with inner end portions of the shock-absorbing portions in front-rear direction; bent portions bent in a crank extending from attachment portions outward in front-rear direction, the beam body being to attachment portions via bent portions, the metal beam fixedly fitted to an outer surface of the beam body's intermediate portion; metal beam's opposite end portions extending beyond bent portions covering the right and left sides, fixedly fitted to distal end portions; each space defined by shock-absorbing portion, metal beam and bent portion.

2 Claims, 5 Drawing Sheets

VEHICLE BUMPER BEAM

TECHNICAL FIELD

The invention relates generally to a vehicle bumper beam, and more specifically to an improvement of a vehicle bumper beam of a hybrid type including a resin beam and a metal beam fixedly fitted to the resin beam.

BACKGROUND ART

There has been proposed a vehicle bumper beam of a hybrid type including (a) a resin beam having an elongate beam body disposed so as to extend along the vehicle-width direction, and a pair of tubular shock absorbing portions respectively disposed at opposite longitudinal end portions of the beam body so as to extend in the vehicle front-rear direction, the beam body and the shock absorbing portions being formed integrally with each other, and (b) a metal beam disposed on one of an outside and an inside of the resin beam in the vehicle front-rear direction and fixedly fitted to the resin beam. A device described in Patent Document 1 is an example of the above-described vehicle bumper beam, and the inside of each of shock absorbing portions is filled with metal foam and end portions of the shock absorbing portions are fixed to a vehicle body via separately-prepared support plates.

PRIOR ART DOCUMENT

Patent Document

Patent document 1: Published Japanese Translation of PCT Application No. 2005-520735

SUMMARY OF THE INVENTION

Problem to be Solved by the Invention

However, when a bumper beam is attached to a vehicle body with the use of separately-prepared support plates as described above, a large number of components are required. This causes problems that an attaching work is cumbersome and that the cost is high. Further, a large number of reinforcing ribs are provided at junctions between shock absorbing portions and a beam body or at the beam body. This complicates the shape of the bumper beam, resulting in a complicated die structure and deterioration of moldability. In this respect as well, there is a possibility that the manufacturing cost will increase.

The invention is made in light of the above-described circumstances, and an object of the invention is to make it possible to easily attach a bumper beam to a vehicle body without the need for separately-prepared support plates and to simplify the shape of the bumper beam while ensuring a prescribed rigidity, thereby reducing the manufacturing cost.

Means for Solving the Problem

To achieve the object, the first aspect of the invention provides a vehicle bumper beam of a hybrid type including: (a) a resin beam having an elongate beam body disposed so as to extend along a vehicle-width direction, and a pair of tubular shock absorbing portions respectively disposed at opposite longitudinal end portions of the beam body so as to extend in a vehicle front-rear direction, the beam body and the shock absorbing portions being formed integrally with each other; and (b) a metal beam disposed on one of an outside and an inside of the resin beam in the vehicle front-rear direction and fixedly fitted to the resin beam, characterized in that (c) flat attachment portions to be attached to a vehicle body are formed integrally with inner end portions of the shock absorbing portions in the vehicle front-rear direction, (d) the beam body is integrally coupled to the attachment portions via bent portions bent in a form of a crank so as to extend from the attachment portions outward in the vehicle front-rear direction, and (e) the metal beam is placed on and fixedly fitted to an intermediate portion of the beam body, and disposed so as to extend beyond the bent portions and reach the shock absorbing portions on right and left sides.

The second aspect of the invention provides the vehicle bumper beam recited in the first aspect of the invention, characterized in that: (a) the metal beam is disposed on the outside of the resin beam in the vehicle front-rear direction, placed on an outer surface of the intermediate portion of the beam body so as to be in contact with the outer surface, and fixedly fitted to the outer surface; and (b) opposite end portions of the metal beam extend beyond the bent portions so as to cover the shock absorbing portions, and are fixedly fitted to distal end portions of the shock absorbing portions.

The third aspect of the invention provides the vehicle bumper beam recited in the first aspect of the invention, characterized in that: the metal beam is formed of a hot-dip galvanized steel sheet subjected to a hot press working and then subjected to an acid treatment so that a zinc oxide film is removed from a surface of the steel sheet; and the metal beam is fixedly fitted to the resin beam through insert molding so that the metal beam is placed on and brought into close contact with an outer surface or an inner surface of the intermediate portion of the beam body.

Effects of the Invention

In the vehicle bumper beam, the attachment portions are formed integrally with the shock absorbing portions, and hence the shock absorbing portions are attached to the vehicle body without the need for separately-prepared support plates. As a result, it is possible to enhance the efficiency of an attaching work and reduce the number of the components, thereby reducing the manufacturing cost. Further, the beam body is integrally coupled to the attachment portions via the bent portions bent in the form of a crank, so that it is possible to obtain a high rigidity and a load is directly transmitted from the beam body to the attachment portions. On the other hand, the metal beam extends from the intermediate portion of the beam body, extends beyond the bent portions and reaches the shock absorbing portions on the right and left sides. Therefore, it is possible to simplify the shape by omitting, for example, the reinforcing ribs of the resin beam while ensuring a prescribed rigidity as a whole. In this respect as well, the manufacturing cost is reduced.

In the second aspect of the invention, the metal beam is disposed on the outside in the vehicle front-rear direction, placed on the intermediate portion of the beam body so as to be in close contact with the intermediate portion, and fixedly fitted to the intermediate portion. Further, the metal beam extends beyond the bent portions to cover the shock absorbing portions and fixedly fitted to the distal end portions of the shock absorbing portions, so that a load is transmitted to the shock absorbing portions via the metal beam to appropriately obtain a shock absorbing effect. Further, each space is defined by the shock absorbing portion, the metal beam and the bent portion, so that the rigidity further enhances, and it is possible to further simplify the shape by omitting, for example, the reinforcing ribs of the resin beam.

In the third aspect of the invention, the metal beam is formed of the hot-dip galvanized steel sheet subjected to the hot press working and then subjected to the acid treatment so that the zinc oxide film is removed from the surface of the steel sheet. Further, the metal beam is fixedly fitted to the resin beam through the insert molding so that the metal beam is placed on and brought into close contact with the intermediate portion of the beam body. Therefore, a prescribed surface bonding strength is obtained, and the number of the mechanical joining portions is decreased to further simplify the shape. That is, in the hot-dip galvanized steel sheet for hot press working, a solid solution layer of zinc plating and a steel sheet is formed due to quenching during the hot press working and micro asperities are formed on the surface of the metal beam, but, at the same time, a zinc oxide film is formed on the surface to hinder the adhesion with a resin. Therefore, the zinc oxide film is removed by the acid treatment, so that the metal beam is fixedly fitted with a prescribed bonding strength with respect to the resin beam due to an anchor effect provided by the micro asperities.

MODES FOR CARRYING OUT THE INVENTION

Figure 1:
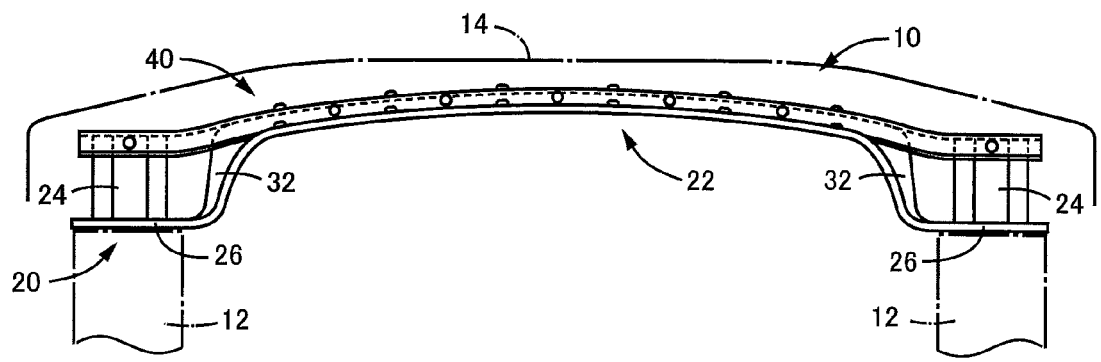
FIG. 1 is a view illustrating a vehicle bumper beam that is an embodiment of the invention along with a bumper and a side member, the drawing being a schematic plan view viewed from above of the vehicle.

The vehicle bumper beam according to the invention may be disposed on the vehicle front side or the vehicle rear side, and may be applied to only one of the vehicle front side and the vehicle rear side. Further, the shape of the bumper beam in its longitudinal direction, that is, the shape of the bumper beam in a planar view seen from a position above the vehicle is, for example, such a shape that the bumper beam is smoothly curved so that a central portion thereof bulges toward the outside of the vehicle (the front side in the case of a front bumper beam, the rear side in the case of a rear bumper beam), but the shape may be a substantially linear shape, or only both end portions of the bumper beam may be tilted or curved toward the vehicle body, namely, various configurations may be adopted. That is, a projecting length of each bent portion of the beam body is determined such that the intermediate portion is substantially flush with the distal end portions of the shock absorbing portions or bulges beyond the distal end portions in the vehicle front-rear direction.

As the resin beam, a thermoplastic resin such as polyamide (PA), polypropylene (PP) or polyphenylene sulfide (PPS) is preferably used. As the metal beam, there is preferably used a steel sheet for hot press working such as a hot-dip galvanized steel sheet that can be hardened by quenching through hot press working. The appropriate section of each of the resin beam and the metal beam in the vehicle up-down direction perpendicular to its longitudinal direction is in an angular flat U-shape (a U-shape with angled corners) or a hat shape, and each of the resin beam and the metal beam is disposed in such a posture that an open side is oriented toward the inside of the vehicle. The resin beam may be provided with reinforcing ribs as needed. To bond the resin beam and the metal beam together, there may be adopted various fixing means such as an adhesive, screws, rivets, swaging of, for example, bosses formed integrally with the resin beam, or insert molding for embedding part of the metal beam in the resin beam.

With regard to the outside and the inside in the vehicle front-rear direction, the vehicle front side is the outside and the vehicle rear side is the inside in the case of a bumper beam disposed at the vehicle front side, whereas the vehicle rear side is the outside and the vehicle front side is the inside in the case of a bumper beam disposed at the vehicle rear side.

Each attachment portion may extend outward substantially perpendicularly from an end portion of the tubular shock absorbing portion in the form of a flange and may have a hole at a region inside the shock absorbing portion. However, it does not matter whether or not each attachment portion has a hole at the region inside the shock absorbing portion, as long as the attachment portion extends outward from the shock absorbing portion and can be fixed to the vehicle body (for example, a side member) with screws or the like. The appropriate shape of each shock absorbing portion is a polygonal tubular shape with a quadrangular or octagonal section, and each shock absorbing portion may have grooves recessed inward, namely, various configurations may be adopted. The inside of each tubular shock absorbing portion is filled with, for example, metal foam as needed, as described in Patent document 1. However, a hollow shock absorbing portion may be adopted.

Each bent portion bent in the form of a crank so as to extend from the attachment portion outward in the vehicle front-rear direction is disposed so as not to come in contact with, for example, the shock absorbing portion. However, reinforcing ribs or the like may be disposed between the bent portion and the shock absorbing portion. The metal beam is disposed so as to extend from the intermediate portion of the beam body, extend beyond the bent portions and reach the shock absorbing portions. When the metal beam is disposed on the outside in the vehicle front-rear direction as in the second aspect of the invention, the metal beam is disposed so as to extend beyond the bent portions and to cover the shock absorbing portions. However, when the metal beam is disposed on the inside in the vehicle front-rear direction, the metal beam may be bent in the form of a crank so as to come into close contact with the bent portions and reach the attachment portions. The metal beam may be disposed so as to extend obliquely from the intermediate portion of the beam body toward each attachment portion, so that a triangular space is formed between the metal beam and each bent portion.

In the third aspect of the invention, the zinc oxide film is removed through the acid treatment. However, another surface cleanup treatment such as a grit treatment or laser cleaning may be adopted. When the zinc oxide film is removed through the acid treatment, it is desirable that the zinc oxide film be removed by brushing after the acid treatment, and then alkali substitution and washing with water be immediately carried out, followed by hot-air drying.

First Embodiment

Hereinafter, embodiments of the invention will be described in detail with reference to the drawings.

FIG. 1 is a schematic plan view of a vehicle bumper beam (hereinafter, simply referred to as "bumper beam") 10 disposed at the front side of a vehicle, FIG. 1 illustrating the bumper beam 10 mounted on the vehicle and viewed from above, and the upper side of the drawing being the front side of the vehicle. The bumper beam 10 has an elongate shape extending in the vehicle-width direction that is the right-left direction of FIG. 1, opposite end portions of the bumper beam 10 are fixedly fitted respectively to front ends of side members 12 of a vehicle body, and a bumper 14 made of a synthetic resin is disposed on the outside of the bumper beam 10 (the vehicle front side).

Figure 2:
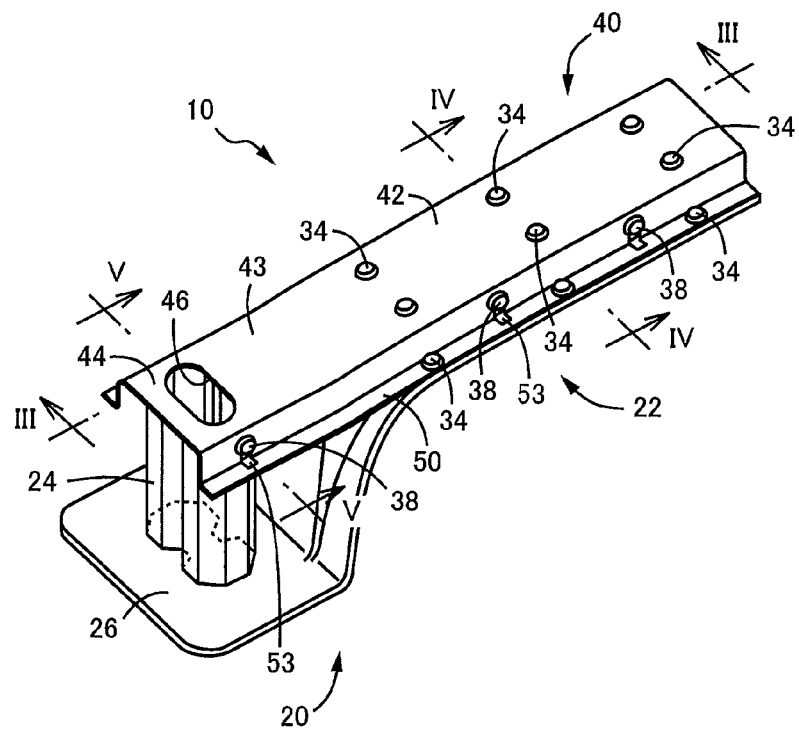
FIG. 2 is a perspective view illustrating the left half of the vehicle bumper beam of FIG. 1.
Figure 3:
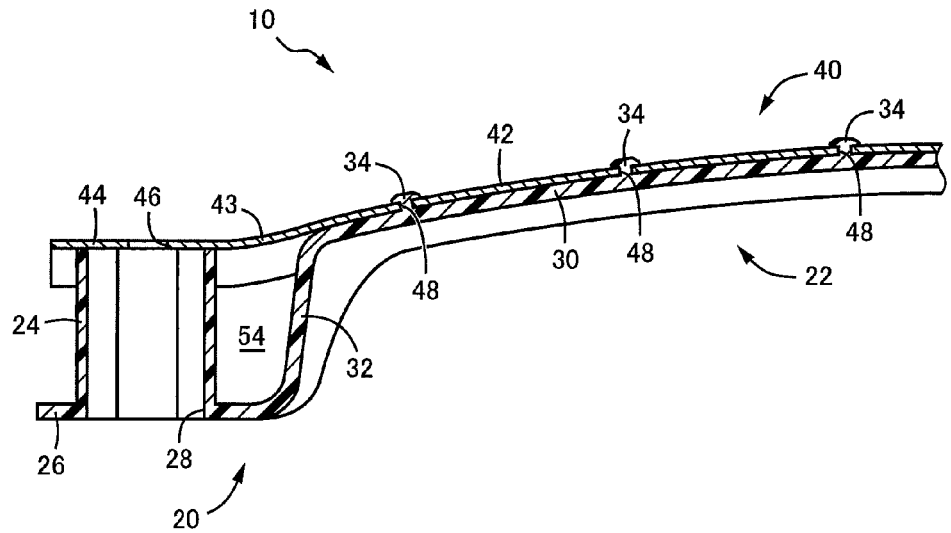
FIG. 3 is a sectional view taken along the line III-III in FIG. 2.
Figure 4:
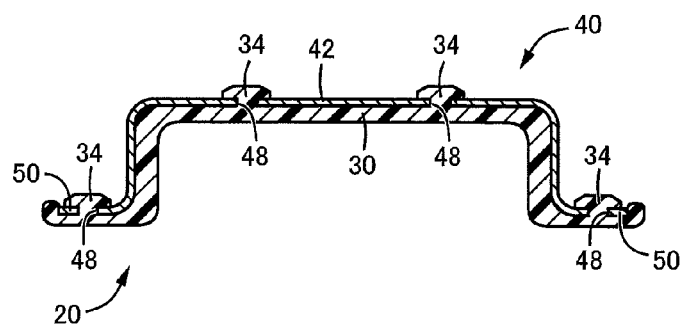
FIG. 4 is an enlarged sectional view taken along the line IV-IV in FIG. 2.
Figure 5:
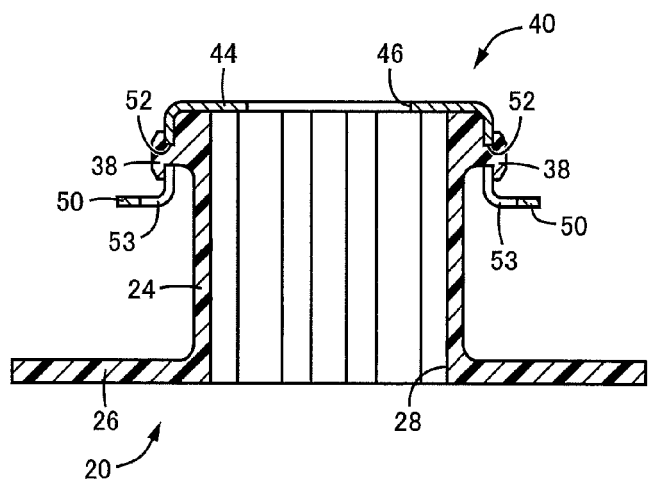
FIG. 5 is an enlarged sectional view taken along the line V-V in FIG. 2.

FIG. 2 is a perspective view illustrating the left half of the bumper beam 10, and FIG. 3 to FIG. 5 are a sectional view taken along the line III-III, an enlarged sectional view taken along the line IV-IV, and an enlarged sectional view taken along the line V-V in FIG. 2, respectively. The right half of the bumper beam 10 is formed symmetrically with the left half illustrated in FIG. 2 to FIG. 5. The bumper beam 10 is formed by fixedly fitting a resin beam 20 made of a synthetic resin and a metal beam 40 together, and the resin beam 20 is formed by molding a thermoplastic resin such as polyamide (PA), polypropylene (PP) or polyphenylene sulfide (PPS) into a prescribed shape through injection molding or the like. The metal beam 40 is obtained by forming a steel sheet for hot press working such as a hot-dip galvanized steel sheet into a prescribed shape through hot press working.

The resin beam 20 has an elongate beam body 22 disposed so as to extend along the vehicle-width direction, and a pair of tubular shock absorbing portions 24 formed integrally with the beam body 22 and respectively disposed at opposite longitudinal end portions of the beam body 22 so as to project toward the vehicle front side, that is, the outside in the vehicle front-rear direction. In the present embodiment, each of the shock absorbing portions 24 has a polygonal tubular shape with a section of an octagonal shape (a rectangular shape of which the four corners are chamfered to be tilted), and grooves are formed respectively in a pair of wide side walls located in the vehicle-width direction. A flat attachment portion 26 to be attached to the side member 12 is formed integrally with an inner end portion of each shock absorbing portion 24 in the vehicle front-rear direction, that is, a rear end portion of each shock absorbing portion 24 in vehicle front-rear direction. The attachment portion 26 extends outward substantially perpendicularly from the end portion of the tubular shock absorbing portion 24 in the form of a flange, and is fixedly fitted to a front end of the side member 12 with screws or the like. Further, a hole 28 having the same shape as the shock absorbing portion 24 is formed in the attachment portion 26 at a region within the shock absorbing portion 24. In the present embodiment, the shock absorbing portion 24 is kept hollow, and the tubular shock absorbing portion 24 is pressed and crushed in its axial direction to absorb an impact load. However, the inside of the shock absorbing portion 24 may be filled with metal foam or the like as needed.

The beam body 22 is formed mainly of an intermediate curved portion 30 that bulges beyond the shock absorbing portions 24 toward the vehicle front side so as to be smoothly curved, and the intermediate curved portion 30 is integrally coupled to the attachment portions 26 via bent portions 32 that are bent in the form of a crank so as to extend from the attachment portions 26 toward the vehicle front side, that is, the outside in the vehicle front-rear direction. Each bent portion 32 extends up to a position near a distal end of the shock absorbing portion 24, and is smoothly connected to the intermediate curved portion 30. The intermediate curved portion 30 has a flat hat sectional shape in a section in the vehicle up-down direction that is perpendicular to the longitudinal direction, and the intermediate curved portion 30 is disposed in such a posture that an open side is oriented toward the inside of the vehicle. Each bent portion 32 also has a hat sectional shape so as to be contiguous to the intermediate curved portion 30, and the height of each side wall of the hat section is gradually decreased toward the attachment portion 26. The intermediate curved portion 30 corresponds to an intermediate portion.

The metal beam 40 is disposed on the vehicle front side, that is, the outside of the resin beam 20 in the vehicle front-rear direction, and is formed mainly of an intermediate curved portion 42 that is smoothly curved and placed on an outer surface of the intermediate curved portion 30 so as to be in close contact with the outer surface. Opposite end portions of the intermediate curved portion 42 in the vehicle-width direction extend beyond the bent portions 32 and cover the shock absorbing portions 24, and are formed integrally with flat load transmitting portions 44 that are placed on the distal ends of the shock absorbing portions 24 so as to be in close contact with the distal ends of the shock absorbing portions 24. The load transmitting portions 44 are smoothly and integrally coupled to the intermediate curved portion 42 via coupling portions 43 while the bent portions 32 of the resin beam 20 extend so as not to come into contact with the shock absorbing portions 24, so that spaces 54 extending in the vehicle up-down direction are defined by the bent portions 32, the shock absorbing portions 24 and the coupling portions 43. In each load transmitting portion 44, an oblong hole 46 is formed in a portion located at a position corresponding to the inside of the tubular shock absorbing portion 24.

The intermediate curved portion 42, the coupling portions 43 and the load transmitting portions 44 each have a flat hat sectional shape in a section in the vehicle up-down direction perpendicular to the longitudinal direction, and are disposed in such a posture that an open side is oriented toward the inside of the vehicle. As is clear from FIG. 3 and FIG. 4, the intermediate curved portion 42 is disposed so as to be placed on the outer side of the intermediate curved portion 30 of the resin beam 20. Further, a plurality of through-holes 48 is formed in a head top portion of the flat hat section, and engaging projections 34 formed integrally with the intermediate curved portion 30 of the resin beam 20 are mechanically engaged with the intermediate curved portion 42 so as to pass through the through-holes 48. Similarly, a plurality of through-holes 48 is formed in flange portions 50 located on the opposite sides of the flat hat section, and engaging projections 34 formed integrally with the resin beam 20 are mechanically engaged with the flange portions 50 so as to pass through the through-holes 48.

As is clear from FIG. 5, the load transmitting portion 44 of the metal beam 40 is disposed so as to cover the distal end of the shock absorbing portion 24 of the resin beam 20. Further, cutouts 52 are formed respectively in side wall portions on the opposite sides of the flat hat section, a pair of engaging projections 38 is formed integrally with the shock absorbing portion 24 of the resin beam 20 so as to project in the vehicle up-down direction (the right-left direction of FIG. 5), and the engaging projections 38 are mechanically engaged with the cutouts 52. Insertion holes 53 into which head portions of the engaging projections 38 can be inserted are formed in the flange portions 50 of the hat section in the load transmitting portion 44 of the metal beam 40 so as to be contiguous to the cutouts 52. Similarly, cutouts 52 and insertion holes 53 are formed respectively in the side wall portions and the flange portions 50 on the opposite sides of the hat section in the intermediate curved portion 42, and engaging projections 38 formed integrally with the intermediate curved portion 30 of the resin beam 20 are mechanically engaged with the cutouts 52 (see FIG. 2).

Figure 6A:
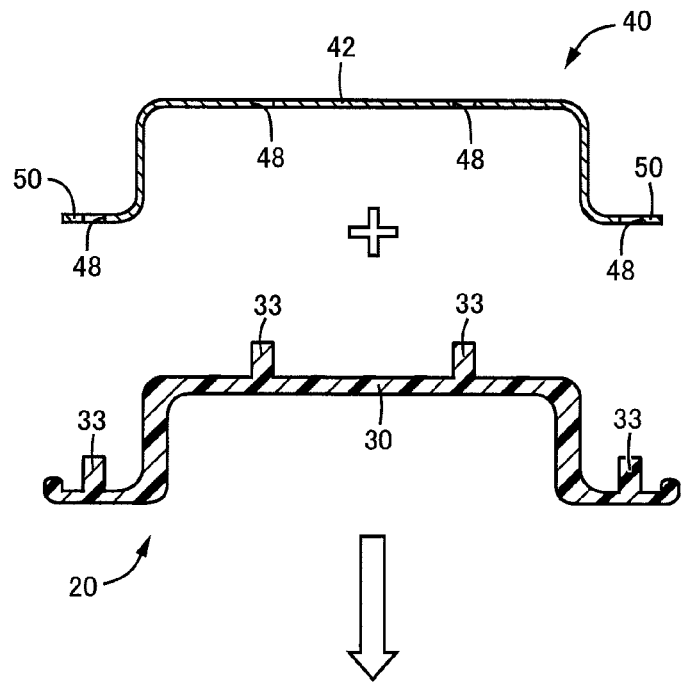
FIG. 6 is a view for describing steps of manufacturing the vehicle bumper beam of FIG. 1.
Figure 6B:
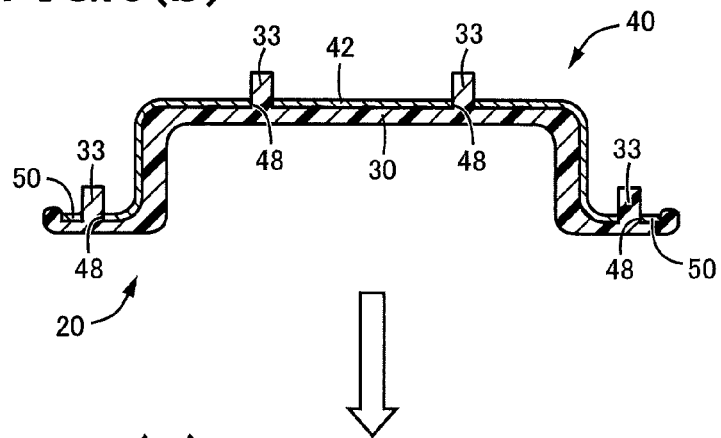
Figure 6C:
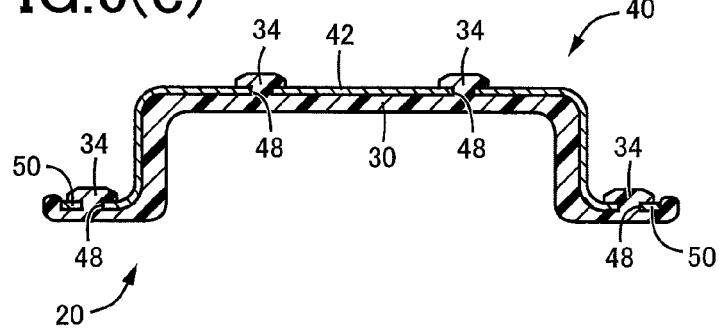

FIG. 6 illustrates views for describing steps of manufacturing the vehicle bumper beam 10, and relates to a sectional portion illustrated in FIG. 4. FIG. 6(a) illustrates a state before the resin beam 20 and the metal beam 40 are fixedly fitted together. In the intermediate curved portion 30 of the resin beam 20 in this state, bosses 33 are formed so as to project at portions corresponding to the engaging projections 34. Then, as illustrated in FIG. 6(b), the resin beam 20 and the metal beam 40 are placed on each other so as to be in close contact with each other, so that the bosses 33 are respectively inserted in the through-holes 48 of the metal beam 40. In this state, the bosses 33 are heated and swaged. Then, as illustrated in FIG. 6(c), the bosses 33 are turned into the engaging projections 34 to be engaged with the metal beam 40, so that the resin beam 20 and the metal beam 40 are fixedly fitted to each other mechanically. The engaging projections 38 are formed so as to project as bosses (not illustrated) in a state where the resin beam 20 is a single body, like the engaging projections 34. As illustrated in FIG. 6(b), when the resin beam 20 and the metal beam 40 are placed on each other to be fitted together, the bosses are inserted into the cutouts 52 through the insertion holes 53, and heated and swaged together with the bosses 33, so that each of the bosses is formed into a shape having a head portion and engaged with the metal beam 40.

In the vehicle bumper beam 10 in the present embodiment, the attachment portions 26 are formed integrally with the shock absorbing portions 24, and hence the shock absorbing portions 24 are attached to the side members 12 without the need for separately-prepared support plates. As a result, it is possible to enhance the efficiency of an attaching work and reduce the number of the components, thereby reducing the manufacturing cost.

Further, the beam body 22 of the resin beam 20 is integrally coupled to the attachment portions 26 via the bent portions 32 bent in the form of a crank, so that it is possible to obtain a high rigidity and a load is directly transmitted from the beam body 22 to the attachment portions 26. On the other hand, the metal beam 40 extends from the intermediate curved portion 30 of the beam body 22, extends beyond the bent portions 32 and reaches the shock absorbing portions 24. Therefore, it is possible to simplify the shape by omitting, for example, the reinforcing ribs of the resin beam 20 while ensuring a prescribed rigidity as a whole. In this respect as well, the manufacturing cost is reduced.

Further, the metal beam 40 is disposed on the outside in the vehicle front-rear direction, placed on the intermediate curved portion 30 of the beam body 22 so as to be in close contact with the intermediate curved portion 30, and fixedly fitted to the intermediate curved portion 30. Further, the metal beam 40 extends beyond the bent portions 32 to cover the shock absorbing portions 24 and fixedly fitted to the distal end portions of the shock absorbing portions 24, so that a load is transmitted to the shock absorbing portions 24 via the metal beam 40 to appropriately obtain a shock absorbing effect. Further, each space 54 is defined by the shock absorbing portion 24, the metal beam 40 and the bent portion 32, so that the rigidity further enhances, and it is possible to further simplify the shape by omitting, for example, the reinforcing ribs of the resin beam 20.

Second Embodiment

Next, another embodiment of the invention will be described. It is to be noted that, in the following embodiment, substantially the same portions as those in the above-described embodiment will be denoted by the same reference symbols as those in the above-described embodiment, and detailed description thereof will be omitted.

Figure 7:
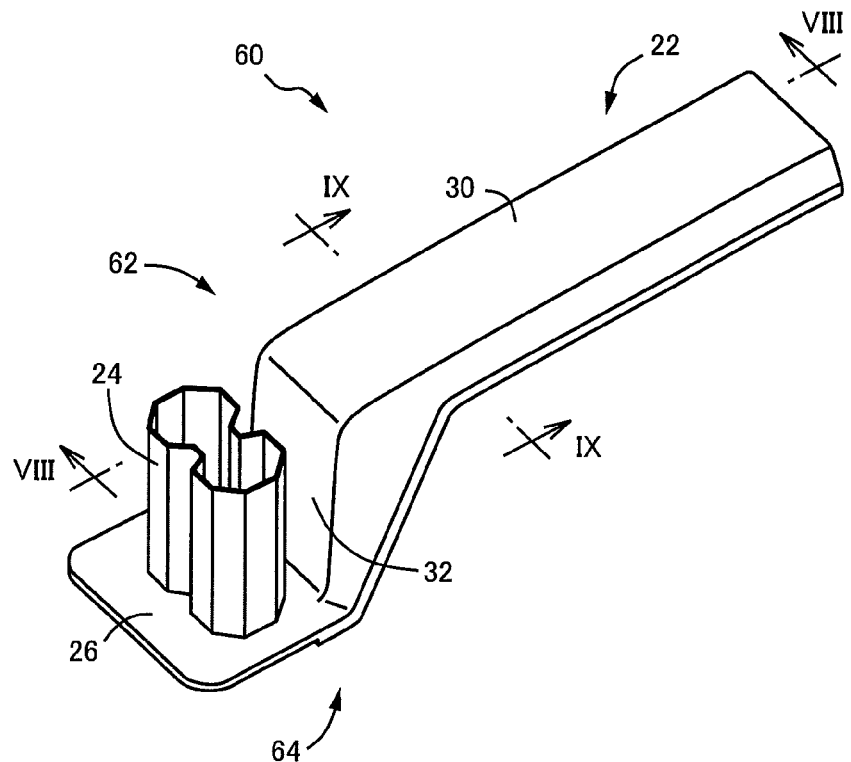
FIG. 7 is a view illustrating a vehicle bumper beam that is another embodiment of the invention, the drawing being a perspective view corresponding to FIG. 2.
Figure 8:
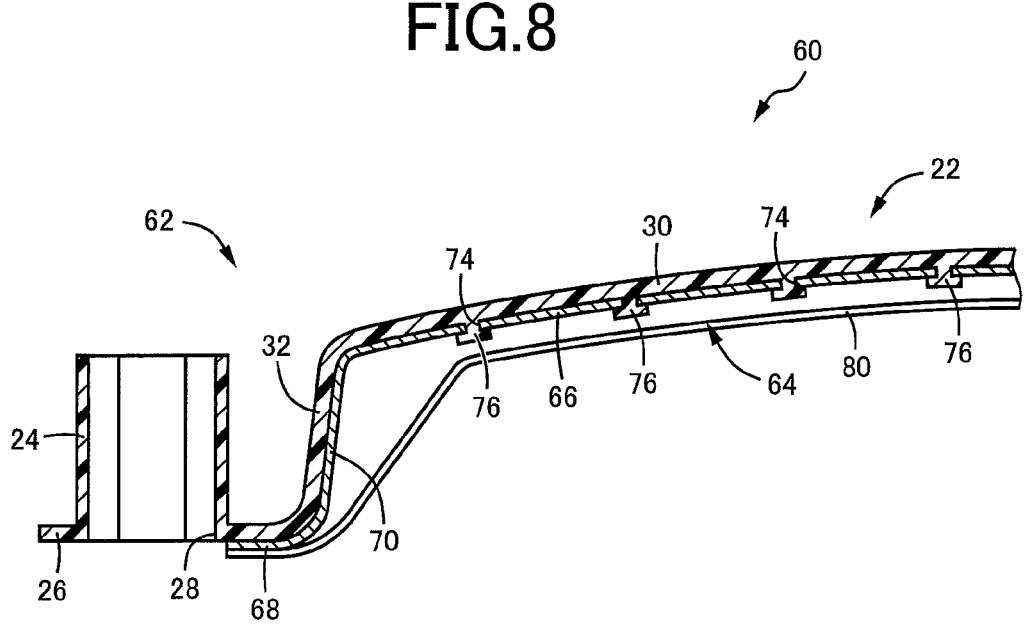
FIG. 8 is a sectional view taken along the line VIII-VIII in FIG. 7.
Figure 9:
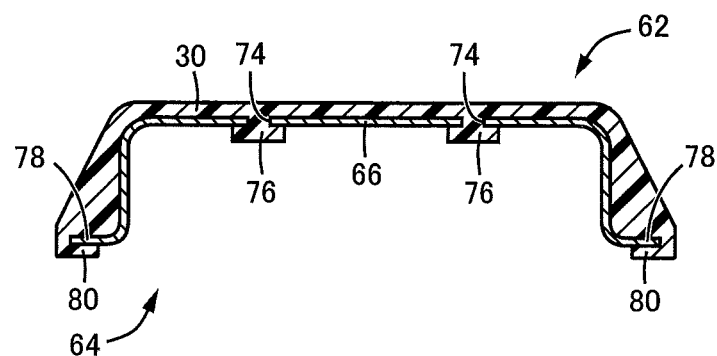
FIG. 9 is an enlarged sectional view taken along the line IX-IX in FIG. 7.
Figure 10:
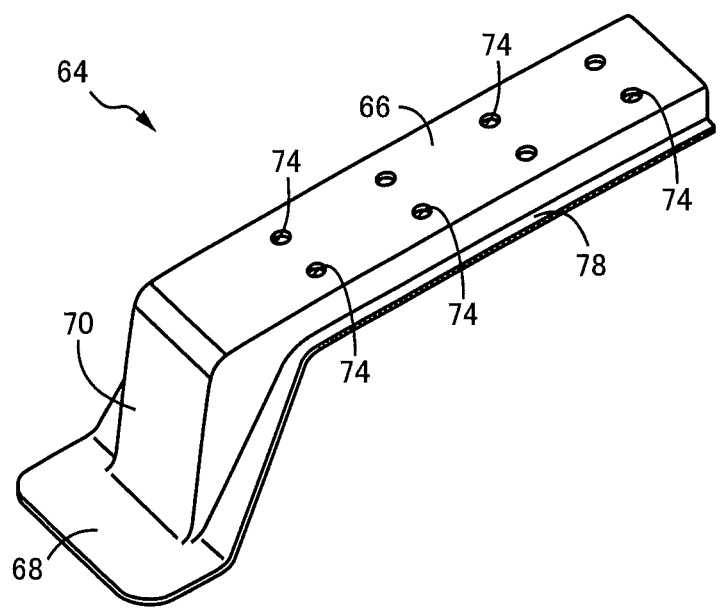
FIG. 10 is a perspective view illustrating a metal beam that is a component of the vehicle bumper beam of FIG. 7.

A vehicle bumper beam 60 in FIG. 7 to FIG. 10 is disposed at the vehicle front side, that is, disposed at the front ends of side members 12 as illustrated in FIG. 1, but a metal beam 64 is fixedly fitted to the inner side of a resin beam 62 in the vehicle front-rear direction, that is, the rear side of the resin beam 62 in the vehicle front-rear direction. FIG. 7 is a perspective view corresponding to FIG. 2, and FIG. 8 and FIG. 9 are a sectional view taken along the line VIII-VIII and an enlarged sectional view taken along the line IX-IX in FIG. 7, respectively. FIG. 10 is a perspective view illustrating the metal beam 64 alone. In the present embodiment, the metal beam 64 is partially embedded in the resin beam 62 through insert molding and mechanically engaged with the resin beam 62. Further, through surface bonding of contact portions of both the beams, the beams are fixedly fitted together. The resin beam 62 has a beam body 22 and shock absorbing portions 24 formed integrally with the beam body 22, like the resin beam 20 in the above-described embodiment, and attachment portions 26 are formed integrally with inner end portions of the shock absorbing portions 24 in the vehicle front-rear direction. Further, an intermediate curved portion 30 of the beam body 22 is integrally coupled to the attachment portions 26 via bent portions 32.

The metal beam 64 is formed mainly of an intermediate curved portion 66 smoothly curved to be placed on an inner surface of the intermediate curved portion 30 of the resin beam 20 so as to be in close contact with the inner surface. Opposite end portions of the intermediate curved portion 66 in the vehicle-width direction extend beyond the bent portions 32 and reach the shock absorbing portions 24, and are formed integrally with flat load transmitting portions 68 that are placed on inner surfaces of the attachment portions 26 in the vehicle front-rear direction so as to be in close contact with the inner surfaces. The load transmitting portions 68 are integrally coupled to the intermediate curved portion 66 via bent portions 70 each bent along the bent portion 32 in the form of a crank, and a load applied to the intermediate curved portion 66 is directly transmitted to the side members 12. The intermediate curved portion 30, the bent portions 32 and the attachment portions 26 of the resin beam 62 are made in close contact with the intermediate curved portion 66, the bent portions 70 and the load transmitting portions 68 of the metal beam 64, respectively, through insert molding.

The intermediate curved portion 66 and the bent portions 70 have a flat hat sectional shape in a section in the vehicle up-down direction perpendicular to the longitudinal direction, and are disposed in such a posture that an open side is oriented toward the inside of the vehicle. In the intermediate curved portion 66, a plurality of through-holes 74 is formed in a head top portion of the flat hat section, and engaging projections 76 formed integrally with the intermediate curved portion 30 of the resin beam 62 are passed through the through-holes 74 and mechanically engaged with the intermediate curved portion 66 during the insert molding. Further, flange portions 78 on the opposite sides of the flat hat section are respectively embedded in a pair of engaging lugs 80 that is formed integrally with the intermediate curved portion 30 of the resin beam 62 so as to cover the flange portions 78 from the outside during the insert molding, so that the flange portions 78 are fixedly fitted to the engaging lugs 80 mechanically. The engaging lugs 80 are formed continuously from the intermediate curved portion 30 via the bent portions 32 so as to reach the flat attachment portions 26, and the flange portions of the bent portions 70 of the hat sectional shape in the metal beam 64 and opposite side edges of the flat load transmitting portions 68 are embedded in the engaging lugs 80 and thus fixedly fitted to the engaging lugs 80 mechanically.

Meanwhile, the metal beam 64 in the present embodiment is formed of a hot-dip galvanized steel sheet for hot press working. A solid solution layer of zinc plating and a steel sheet is formed due to quenching during the hot press working and micro asperities are formed on the surface of the metal beam 64, but, at the same time, a zinc oxide film is formed on the surface to hinder the adhesion with a resin. Therefore, in the present embodiment, the zinc oxide film is removed according to the following steps (1) to (4) to carry out the insert molding, so that a prescribed surface bonding strength with respect to the resin beam 62 is obtained due to an anchor effect provided by the micro asperities of the surface of the metal beam 64. Thus, the number of the engaging projections 76 that are mechanical joining portions is decreased, and thus the shape of, for example, a molding surface of an injection molding die for the resin beam 62 is simplified, so that it is possible to reduce the cost.

(1) The hot-dip galvanized steel sheet is subjected to the hot press working to prepare the metal beam 64 having a hat sectional shape.

(2) Portions of the metal beam 64 other than a surface bonding portion (a close contact portion) with respect to the resin beam 62 are masked, and an acid treatment in which the metal beam 64 is immersed in hydrochloric acid of 1% for about two minutes is carried out. The masking is carried out with a clamp integrated with a jig used during the immersion, a rubber resin having a resistance to hydrochloric acid is used in a clamp portion, and the clamp portion is brought into close contact with the metal beam 64.

(3) The metal beam 64 subjected to the acid treatment is taken out and brushed to remove the zinc oxide film, and alkali substitution and washing with water are immediately carried out, followed by sufficient hot-air drying.

(4) The metal beam 64 after treatment is set to an injection molding die, and the resin beam 62 is fixedly fitted to the metal beam 64 through insert molding.

In the present embodiment as well, the attachment portions 26 are formed integrally with the shock absorbing portions 24, and hence the shock absorbing portions 24 are attached to the side members 12 without the need for separately-prepared support plates. As a result, it is possible to enhance the efficiency of an attaching work and reduce the number of the components, thereby reducing the manufacturing cost.

Further, the beam body 22 of the resin beam 62 is integrally coupled to the attachment portions 26 via the bent portions 32 bent in the form of a crank, so that it is possible to obtain a high rigidity and a load is directly transmitted from the beam body 22 to the attachment portions 26. On the other hand, the metal beam 64 extends from the intermediate curved portion 30 of the beam body 22, extends beyond the bent portions 32 and reaches the shock absorbing portions 24. Therefore, it is possible to simplify the shape by omitting, for example, the reinforcing ribs of the resin beam 62 while ensuring a prescribed rigidity as a whole. In this respect as well, the manufacturing cost is reduced.

Further, the metal beam 64 is disposed on the inside in the vehicle front-rear direction, and the intermediate curved portion 66 is placed on the inner surface of the intermediate curved portion 30 of the beam body 22 so as to be in close contact with the inner surface, and is fixedly fitted to the inner surface. Further, the metal beam 64 has the bent portions 70 and the load transmitting portions 68 that extend along the bent portions 32 and reach the attachment portions 26, and hence a load applied to the intermediate curved portion 66 of the metal beam 64 is directly transmitted from the bent portions 70 and the load transmitting portions 68 to the side members 12 of the vehicle. Thus, the rigidity is enhanced.

Further, the metal beam 64 is formed of the hot-dip galvanized steel sheet subjected to the hot press working and then subjected to the acid treatment so that the zinc oxide film is removed from the surface of the steel sheet. Further, the metal beam 64 is fixedly fitted to the resin beam 62 through the insert molding so that the metal beam 64 is placed on and brought into close contact with the intermediate curved portion 30, the bent portions 32 and the attachment portions 26 of the beam body 22. Therefore, a prescribed surface bonding strength is obtained, and the number of the engaging projections 76 that are the mechanical joining portions is decreased to further simplify the shape.

While the embodiments of the invention have been described above in detail with reference to the drawings, each of the embodiments is merely one mode for carrying out the invention, and the invention may be implemented in various other modes obtained by making various modifications and improvements to the embodiments on the basis of knowledge of a person skilled in the art.

NOMENCLATURE OF ELEMENTS 10, 60: vehicle bumper beam 12: side member (vehicle body) 20, 62: resin beam 22: beam body 24: shock absorbing portions 26: attachment portions 30: intermediate curved portion (intermediate portion) 32: bent portions 40, 64: metal beam

The invention claimed is:
1. A vehicle bumper beam of a hybrid type including:
a resin beam having an elongate beam body disposed so as to extend along a vehicle-width direction, and a pair of tubular shock absorbing portions respectively disposed at opposite longitudinal end portions of the beam body so as to extend in a vehicle front-rear direction, the beam body and the shock absorbing portions being formed integrally with each other; and
a metal beam disposed on an outside of the resin beam in the vehicle front-rear direction and fixedly fitted to the resin beam, the vehicle bumper beam further comprising flat attachment portions to be attached to a vehicle body, and bent portions bent in a form of a crank so as to extend from the attachment portions outward in the vehicle front-rear direction,
the flat attachment portions being formed integrally with inner end portions of the shock absorbing portions in the vehicle front-rear direction,
the beam body being integrally coupled to the attachment portions via the bent portions,
the metal beam being placed on and fixedly fitted to an outer surface of an intermediate portion of the beam body so as to be in contact with the outer surface, and opposite end portions of the metal beam extending beyond the bent portions so as to cover the shock absorbing portions on right and left sides, and are fixedly fitted to distal end portions of the shock absorbing portions, and each space being defined by the shock absorbing portion, the metal beam and the bent portion.

2. The vehicle bumper beam according to claim 1, wherein the metal beam is formed of a hot-dip galvanized steel sheet subjected to a hot press working and then subjected to an acid treatment so that a zinc oxide film is removed from a surface of the steel sheet; and the metal beam is fixedly fitted to the resin beam through insert molding so that the metal beam is placed on and brought into close contact with the outer surface of the intermediate portion of the beam body.

* * * * *